US006628871B2

(12) United States Patent
Maroney et al.

(10) Patent No.: US 6,628,871 B2
(45) Date of Patent: Sep. 30, 2003

(54) FIBER FUSE PROTECTION

(75) Inventors: Andrew V. Maroney, South Woodford (GB); Vincent Handerek, Grays (GB); Kevin J Cordina, Herts (GB)

(73) Assignee: Nortel Networks Limited, St. Laurent (CA)

( * ) Notice: Subject to any disclaimer, the term of this patent is extended or adjusted under 35 U.S.C. 154(b) by 462 days.

(21) Appl. No.: 09/751,884

(22) Filed: Dec. 22, 2000

(65) Prior Publication Data

US 2002/0114608 A1 Aug. 22, 2002

(51) Int. Cl.[7] .............................. G02B 6/16; H04B 10/08
(52) U.S. Cl. ......................... 385/123; 385/15; 385/39; 385/147; 398/15; 398/25; 398/20; 398/21
(58) Field of Search ............................ 385/27, 28, 39, 385/42, 43, 123, 95, 96, 98; 359/333, 341.1, 341.3, 341.43; 398/15, 25, 20, 21

(56) References Cited

U.S. PATENT DOCUMENTS

| | | | | |
|---|---|---|---|---|
| 5,013,118 A | * | 5/1991 | Sniadower | 398/144 |
| 5,546,485 A | * | 8/1996 | Darcie | 385/28 |
| 5,659,644 A | * | 8/1997 | DiGiovanni et al. | 385/31 |
| 5,790,735 A | * | 8/1998 | Oleskevich et al. | 385/127 |
| 5,796,891 A | * | 8/1998 | Poustie et al. | 385/28 |
| 6,185,346 B1 | * | 2/2001 | Asawa et al. | 385/28 |
| 6,282,342 B1 | * | 8/2001 | Berkey et al. | 385/43 |
| 6,295,161 B1 | * | 9/2001 | Bazzocchi | 359/341.33 |
| 6,330,382 B1 | * | 12/2001 | Harshbarger et al. | 385/28 |
| 6,477,295 B1 | * | 11/2002 | Lang et al. | 385/31 |
| 6,563,989 B2 | * | 5/2003 | Ishikawa et al. | 385/43 |
| 2002/0054740 A1 | * | 5/2002 | Vakili et al. | |
| 2002/0114608 A1 | * | 8/2002 | Moroney et al. | |

OTHER PUBLICATIONS

Hand, Single–Mode Tapers As 'Fibre Fuse' Damage Circuit–Breakers, Electronics letters, vol. 25, No. 1, Jan. 5, 1989, pp. 33–34.

* cited by examiner

Primary Examiner—Brian Healy
(74) Attorney, Agent, or Firm—Barnes & Thornburg

(57) ABSTRACT

A method of routing of signals through an optical network involves determining a route through the network for which the power level within each branch of the network along the route is below a threshold power level which is a function of the fiber characteristics of the branch. This threshold power is the power below which a fiber fuse can not be initiated. This method enables power levels within a network to be controlled such that the threshold power is not exceeded, and a fiber fuse will not be initiated. The invention provides a network controller for carrying out this method.

11 Claims, 3 Drawing Sheets

FIBER FUSE PROTECTION

FIELD OF THE INVENTION

The present invention relates to the phenomenon known as a fiber fuse, and in particular a method of controlling a network to reduce the likelihood of a fiber fuse being initiated.

BACKGROUND OF THE INVENTION

Optical power levels in optical transmission systems are generally increasing. This is due to a number of factors.

For instance, optical transmission systems, including optical fibers and other optical devices such as polarisation mode dispersion compensation mechanisms and photonic switches, all have attenuation characteristics. Increasing the power or an optical signal provides a better signal to background noise ratio, and allows the signal to be transmitted longer distances over the optical transmission system before optical amplification is required. Advances in laser technology have ensured that higher powered lasers are now more readily and cheaply available, thus allowing a cost effective implementation of high optical power signal generation.

Typical optical transmission systems simultaneously transmit data using a multitude of different wavelengths, each transmission channel having a separate wavelength of light for transmission of the respective optical signal. Increasingly, channels are becoming more closely packed together with regard to wavelength e.g. DWDM (Dense Wavelength Division Multiplexed) systems. Increasing the number of simultaneous optical transmissions at different wavelengths will increase the average optical power being carried by the transmission system.

Many optical systems utilise optical amplifiers comprising optical fiber. An example of this is a Raman amplifier i.e. an amplifier that utilises the Raman effect. Optical amplifiers of this type normally use relatively high power pump laser, for providing the optical power that is utilised to amplify the optical signal power. Current trends indicate it is increasingly likely that Raman amplifiers will be utilised in future telecommunications systems.

Experiments have indicated that high optical powers propagating through fibers can induce an effect referred to as a "fiber fuse". The fiber fuse effect, also termed self-propelled self-focusing (SPSF), is a catastrophic damage mechanism. *Electronics letters,* Jan. 7, 1988. Vol. No. 1, pages 47–48 by R Kashyap & K J Blow and *Electronics letters* Jan. 5, 1989, Vol. 25, No.1, Pages 33–34 by D P Hand & T A Birks describe this phenomena in some detail and describe a fiber fuse damage circuit-breaker, and are incorporated herein by reference.

The fiber fuse effect is believed to be initiated by local heating of the fiber. This can lead to a runway thermal effect which, provided the laser power is sufficient, continues until the fiber core melts. A thermal shock wave is created (visible as a bright spot of side-scattered light) that propagates back along the fiber towards the optical power source. This results in the fiber being permanently damaged and unable to guide light.

Propagation velocity is believed to be of the order of tens of meters per second. A fiber fuse occurring in a telecommunications system could be extremely damaging. Additionally, in systems where optical fiber spans (i.e. typically the length between optical fiber amplifiers) are of the order of 80 kilometers, it will be appreciated that if the fiber fuse is not contained it has the capacity to damage large lengths of optical fiber. This would require replacement of the damaged fiber. If the fiber fuse is able to propagate into optical processing equipment, such as an amplifier or pump laser, the fiber fuse can result in damage to very expensive network components.

It is therefore desirable to limit the damage caused by fiber fuses or to reduce significantly the risk of a fiber fuse developing. As mentioned above, it has been proposed that the initiation of a fiber fuse results from local heating of the fiber. How this local heating is initiated has not been fully understood, although it has been recognised that a fiber fuse may be initiated at the site of fiber damage, such as a fiber break.

The fiber fuse effect is also discussed in the assignee's copending U.S. patent application Ser. No. 09/544,362, filed Apr. 6, 2000 entitled "Fiber Fuse Protection" which is incorporated herein by way of reference material, There is a need to predict the conditions under which a fiber fuse is likely to be initiated in order to enable corrective action to be taken.

SUMMARY OF INVENTION

The invention is based on the realisation that a fiber fuse can only be initiated within a fiber when the fiber is carrying power greater than a threshold power. This threshold power is a function of the fiber type.

In one aspect, the present invention provides a method of routing of signals through an optical network, comprising determining a route through the network for which the power level within each branch of the network along the route is below a threshold power level which is a function of the fiber characteristics of the branch.

This method enables power levels within the network to be controlled such that a threshold power is not exceeded, which threshold power is considered to be the power below which a fiber fuse can not be initiated. The realisation that this threshold power level exists is the result of prolonged study of operating conditions leading to a fiber fuse.

In particular, it has been found that the threshold power is a function of the core diameter and the higher mode cutoff wavelength of a fiber. For large core diameters, an increase in core diameter increases the threshold power. This is considered to result from reduced "thermal lensing". This is one phenomenon which can be used to explain the propagation of the thermal fuse, and is based on the idea that a local fuse location is imaged to a focal point within the core at an adjacent location, at which a fuse is created. Increasing the core diameter, and therefore the mode field diameter, increases the size of these focal points and thereby reduces the intensity. For small core diameters, it is believed that heat dissipates more readily to the cladding, so that as the core diameter is reduced, the threshold also increases. Thus, the threshold power has a minima value with respect to core diameter (for a fiber of constant cutoff wavelength)

In a another aspect, the invention provides a method of controlling the routing of signals through an optical network, comprising:

determining a route through the network;

estimating the power level within each branch of the network along the route and determining the fiber characteristics of each branch of the network along the route;

comparing the power level for each branch with a threshold power level, wherein the threshold power level is a function of the fiber characteristics of the branch; and if the power exceeds the threshold power level, determining an alternative route through the network.

This routing method ensures that the route does not result in the threshold power being exceeded in any branch of the network. This method may only be possible if the network has been desired to support a volume of optical traffic flow which can be routed in this manner. If the invention is to be applied to existing networks, it may not be possible to ensure that the threshold power levels are not exceeded at any location in the network.

Therefore, in a further aspect, the invention provides a method of monitoring an optical network to predict the initiation of a fiber fuse, comprising:

measuring the power level within each branch of the network and determining the fiber characteristics of each branch of the network; and comparing the power level for each branch with a threshold power level, wherein the threshold power level is a function of the fiber characteristics of the branch.

In this method, locations within a network where a fiber fuse is most likely to be initiated are identified. This then enables specific monitoring to be applied to that location with the network. For example, local losses at the location may be measured. For example, if an increase in local loss is detected, power levels of the signals provided to the network can be reduced. An increase in local losses may indicate degradation of components, which can lead to a fiber fine being initiated.

In a further aspects, the invention also provides a computer program product storing a computer program for implementing a method of monitoring all optical network to predict the initiation of a fiber fuse, the method comprising:

measuring the power level with each branch of the network and determining the fiber characteristics of each brat of the network; and comparing the power level for each branch with a threshold power level, wherein the threshold power level is a function of the fiber characteristics of the branch.

According to a still further aspect of the invention, there is provided an of network management system comprising:

power monitoring equipment for monitoring the power it branches of the network;

a threshold generator for generating threshold powers below which a fiber fuse is not expected to be initiated for different types of fiber within the network, wherein the threshold powers are a function of the fiber characteristics; and a comparator for comparing the threshold powers with the monitored powers.

This management system enables the routing to be controlled to premium power levels exceeding the threshold, or enables other measures to be taken. The threshold power level may again be a function of the core diameter and the higher mode cutoff wavelength of the fiber of the branch, and again represents minimum power at which a fiber fuse can be initiated.

BRIEF DESCRIPTION OF DRAWINGS

Examples of the invention will now be described in detail with reference to the accompanying drawings, in which.

DETAILED DESCRIPTION OF PREFERRED EMBODIMENTS

The invention is based on prolonged studies of the fiber fuse effect, and some significant findings of these studies will first be given, to enable the invention to be understood more fully.

Figure 1:
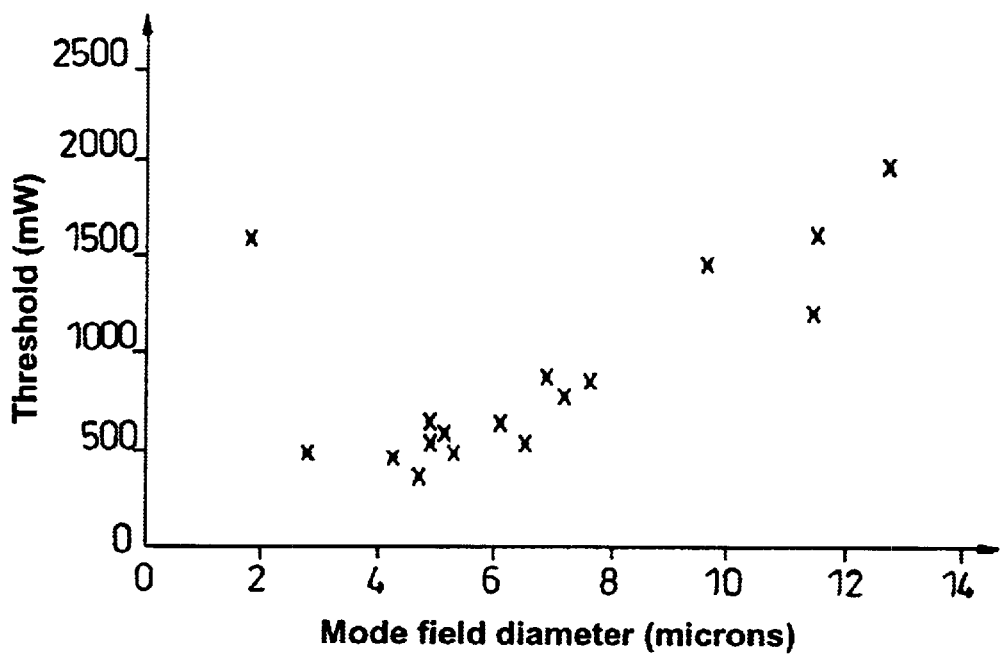
FIG. 1 shows experimental results which show the minimum signal powers at which a fiber fuse can be initiated for different fibers.

FIG. 1 shows experimental results which show the minimum signal powers which were carried by different optical fibers when a fiber fuse could be initiated. Different techniques were employed to trigger the fiber fuse, for example including exposing broken or cleaved fiber ends to heat absorbers (thereby promoting localised heating).

FIG. 1 plots the fiber mode field diameter against the minimum power at which a fuse can be initiated, hereinafter referred to as the "threshold power". The results shown in FIG. 1 are based on experimentation and suggest that there is a linear dependence of the threshold power on the mode field diameter (MFD) of the radiation within the fiber for an MFD greater than 4 microns. Also, there is an absolute minimum power required for fuse behaviour, below which even the most susceptible fiber does not exhibit the effect. This is close to 375 mW. This minimum power seems to be required in order to create an area of local absorption within the fiber via heating to the point of thermal runaway. At very small MFD the threshold rises again, possibly because the small core sizes involved make generating thermal effects more difficult.

It has also been found, by separate experimentation, that the fuse triggering threshold is also the threshold at which the fuse will terminate as the power is gradually reduced. Additionally the likelihood of triggering a fuse depends strongly on the extra power above threshold in the fiber, and spontaneous fuses can be generated from poor quality cleaves at high enough powers.

FIG. 1 shows that above an MFD of four microns the fuse threshold varies approximately linearly with MFD. This allows prediction of the fuse power thresholds for most fibers. An empirical model was developed to predict the task threshold power $P_{th}$ of a fiber given its higher mode cut-off wavelength, core diameter and the operating wavelength. Within the region displaying the linear trend with MFD, the fuse threshold is approximated by equation (1):

$$P_{th} = \phi\left(\frac{\varphi}{\varphi_c}\right)(105 + 5.869\phi) mW \qquad (1)$$

where φ is the core diameter in microns and $\varphi$ and $\varphi_c$ are the mode field diameters respectively at the operating wavelength λ and at the higher mode cutoff wavelength, $\lambda_c$. The mode field diameter can be approximated (in known manner) by:

$$\varphi = \phi\left(0.65 + 3.894\left(\frac{\lambda_c}{\lambda}\right)^{\frac{3}{2}} + 6.924\left(\frac{\lambda_c}{\lambda}\right)^{-6}\right) \qquad (2)$$

The mode field diameter is thus a function of the core diameter and the cutoff wavelength. Likewise, the threshold power is also a function of the core diameter and cutoff wavelength in the linear region.

Equation (1) suggests that the fuse threshold scales approximately linearly with core diameter, with a correction factor related to the variation of mode field diameter with normalised frequency. The predicted fuse threshold has been found to be accurate for all quasi-step index fibers tested, provided that they remain single mode. The formula is not accurate for other fiber designs.

At small mode field diameters, the model uses equation (3) below. As the MFD approaches zero, the threshold intensity suggested by the model approaches the intrinsic damage threshold of silica.

$$P_{th}=7.59\times10^3 e^{-1.07\phi} mW \quad (3)$$

In the low MFD region, the threshold power is again a function of the core diameter and cutoff wavelength. Thus, the threshold power in for all mode filed diameter values is a function of the core diameter and cutoff wavelength.

Figure 2:
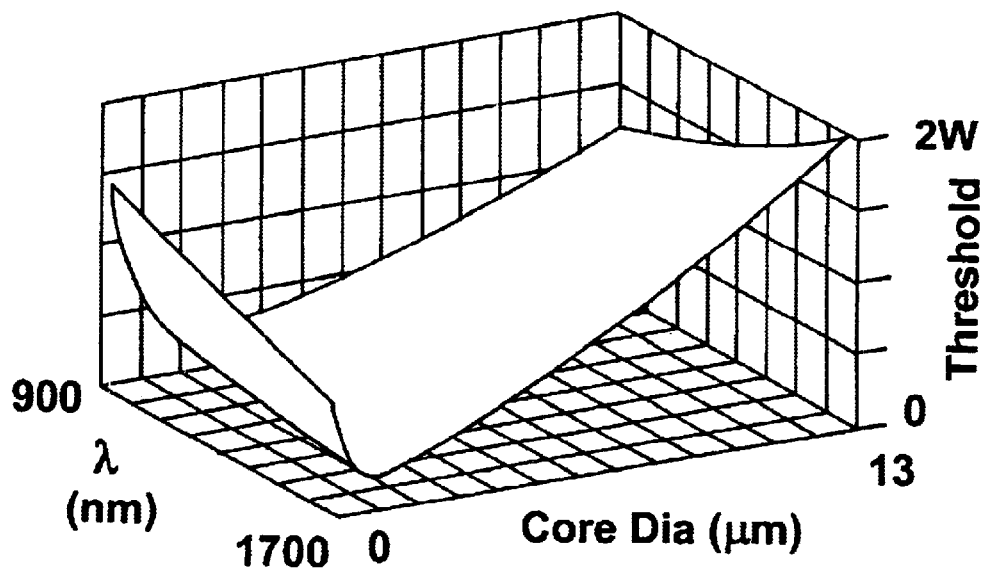
FIG. 2 shows an example of threshold variation with wavelength and core diameter for a given higher mode cutoff wavelength.

FIG. 2 shows an example of threshold variation with wavelength and core diameter for a given higher mode cut-off wavelength, using both expressions (1) and (3). The fiber fuse threshold is a function of the wavelength of the signals transmitted in the fiber, and the threshold power is the power of signals at that wavelength below which a fiber fuse cannot be initiated.

The ability to predict the fiber fuse threshold from a knowledge of the basic characteristics of a fiber enables control or design of a network to ensure that a fiber fuse will not be initiated.

Figure 3:
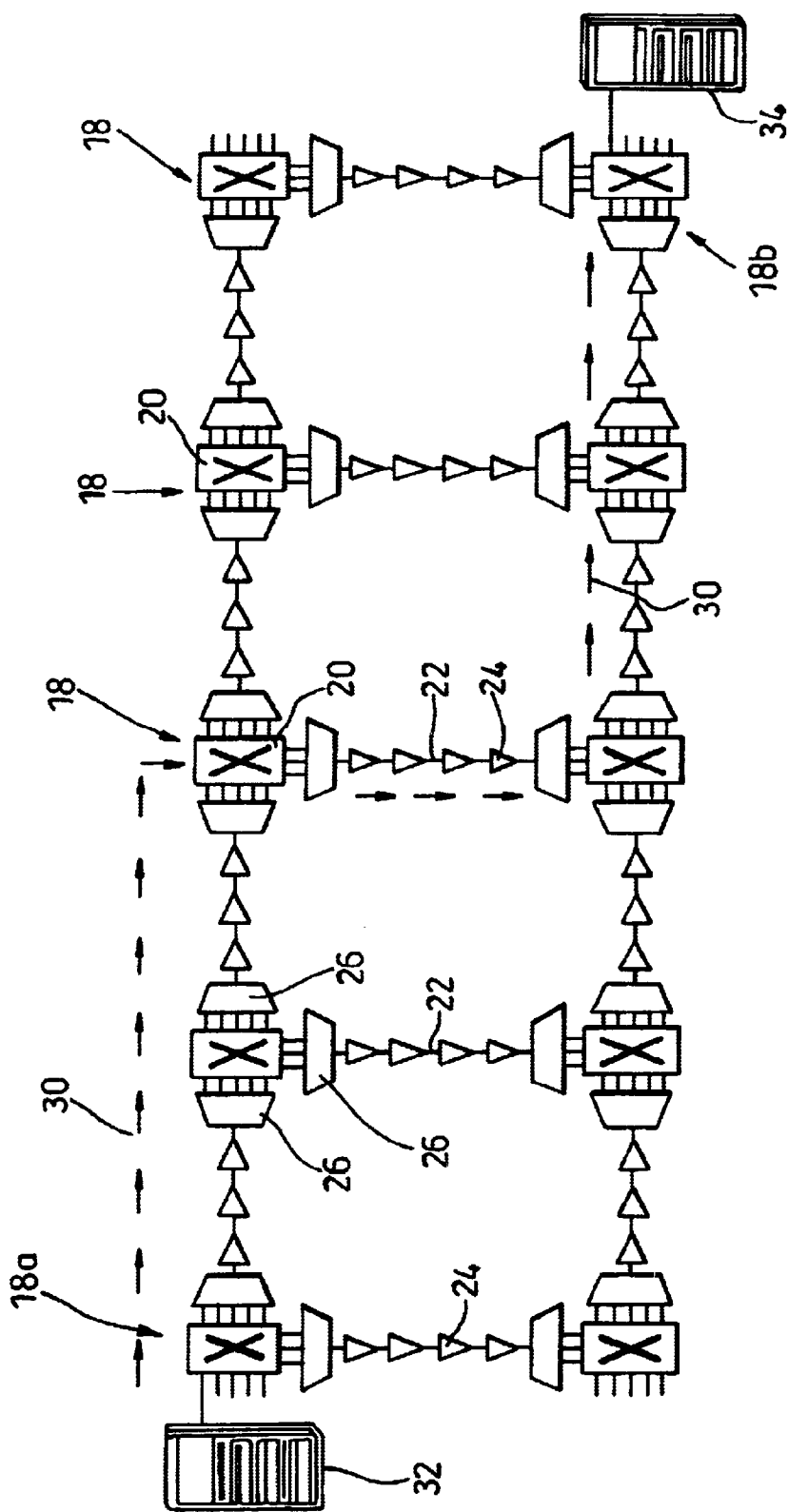
FIG. 3 shows a network in which the invention may be employed.

FIG. 3 shows a WDM optical communications network comprising a plurality of interconnected nodes 18, each node comprising an optical switching arrangement 20 for performing routing of signals across the network. The nodes are connected together by optical fibers 22 along which optical amplifiers 24 are placed. The fibers 22 carry WDM optical signals, and each node comprises a multiplexing/demultiplexing units 26 which provide the channels of the WDM system on individual fibers to the switching arrangement 20. The switching arrangement may switch individual channels, bands of channels, all channels or the entire fiber signal.

The arrows 30 indicate one possible connection through the network enabling equipment 32 at a source node 18a to communicate with equipment 34 at a designation node 18b.

The equipment 32, 34 is any device which provides optical signals for transmission over the network or which is provided for receiving signals from the network.

In accordance with the invention, the routing of signals through the network is selected such that the power level within each branch of the network along the route is below the threshold power level, which is a function of the fiber characteristics of the branch. As an approximation, a single threshold power may be taken, which then represents the maximum total power in the fiber across all WDM wavelengths, although, as shown in FIG. 2, the threshold power is in fact a function of the signal wavelength. Since power in a WDM system is distributed across many wavelengths, an approximation is preferably made. For example, the threshold for the total signal power may be considered to be equal to the threshold for the wavelength lying in the middle of the band of wavelengths of the WDM system.

The power in each branch may result not only from the optical signals at the different WDM wavelengths, but also result from Raman amplification.

In FIG. 3, the route 30 will thus be selected such that the total power in all of the branches of the route is below the threshold for each branch. The branches may be formed of different fiber types, and this will give rise to a different power threshold in different branches.

The selection of the route may be an iterative process. For example a first route is determined through the network. The power level within each branch of the network along the route is determined, and compared with the threshold power level for branch. If the power exceeds the threshold power level then a different route is calculated.

If the network has been designed accordingly, it will be possible to ensure that routing is always possible which avoids the power threshold being exceeded. However, where an existing network architecture is being used, the volume of signal traffic may be such that power levels exceeding the threshold cannot be avoided.

In this case, a best route can be determined and then the network may be monitored, concentrating on the areas where a fiber fuse is most likely. This involves measuring the power level within each branch of the network and comparing the power level for each branch with the threshold power level, which is again a function of the fiber characteristics of the branch. Existing networks already have power monitoring arrangements, and these essentially comprise taps provided at distributed locations within the network, which tap off signals for level measurement using a photodiode receiver.

If the power exceeds the threshold power level, local losses within the branch can be measured. An increase in loss or scattering at a specific location can be representative of imminent component failure or fiber damage. These are potential causes of the initiation of a fiber fuse. If an increase in local loss or scattering is detected, power levels of the signals provided to the network can be reduced. The OTDR system (Optical Time Division Reflectometry) is one way of achieving local loss data along a fiber span, and will be well known to those skilled in the art.

The routing of signals through the network and/or the monitoring of powers can be under the control of a network controller which communicates with the nodes of the network and which received data from the power monitoring locations.

Figure 4:
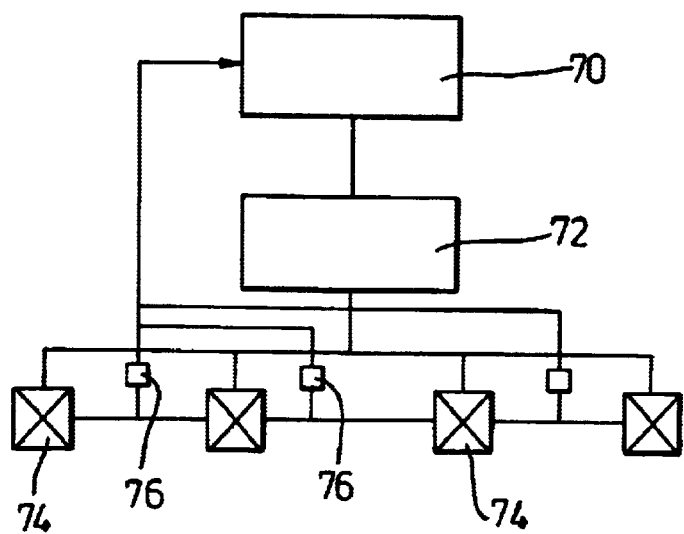
FIG. 4 shows the network control architecture of the network of FIG. 3.

FIG. 4 shows schematically the network control architecture. A network control center 70 performs general network control functions, such as fault monitoring and access security management. Inspections from the control centre 70 are implanted by lower level control architecture 72, which carries out the functions of bandwidth management, wavelength and route management (for example using OSPF and MPLS type protocols) and other network management operations. In accordance with the invention, the routing operation can be supplemented with information concerning the fiber types of each branch of the network and the total signal powers in the network branches. The lower level control architecture 72 communicates directly with the nodes 74, for example to enable the optical switching instructions to be relayed to the nodes. The lower level control architecture 72 can be implemented as software located at the site of the control center 70 or it can be distributed between the nodes.

Figure 5:
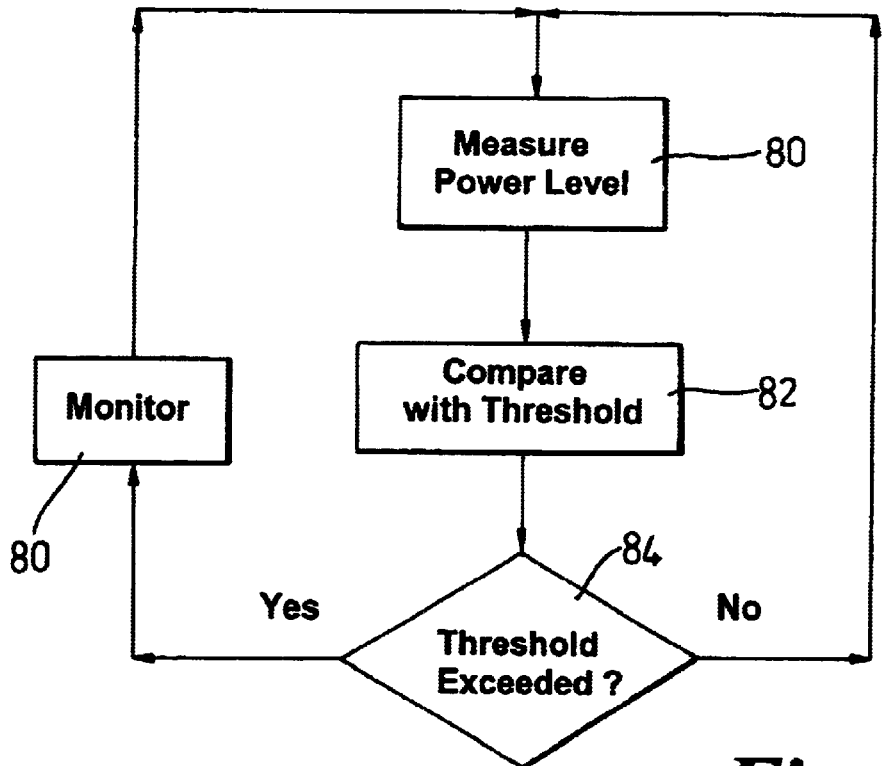
FIG. 5 shows the steps of a method of the invention.

As shown in FIG. 5, the software is for measuring the power level within each branch of the network (step 80) and comparing the power level for each branch with the threshold power level (step 82). If the threshold is exceed, as determined in step 84, a monitoring step 86 involves monitoring the loss at that location or else selecting a new route through the network.

The network management system 70,72 comprises power monitoring equipment 76 for monitoring the signal power in branches of the network. A threshold generator generating threshold powers below which a fiber fuse is not expected to be initiated for the different types of fiber within the network, using the equations given above. A comparator is provided for comparing the threshold powers with the monitored signal powers.

What is claimed is:

1. An optical network management system comprising:

power monitoring equipment for monitoring the power in branches of the network;

a threshold generator for generating threshold powers below which a fiber fuse is not expected to be initiated for different types of fiber within the network, wherein the threshold powers are a function of the fiber characteristics; and a comparator for comparing the threshold powers with the monitored powers.

2. A system according to claim 1, wherein the threshold power level is a function of the core diameter and the higher mode cutoff wavelength of the fiber of the branch.

3. A system according to claim 1, wherein the threshold power level represents the minimum power at which a fiber fuse can be initiated.

4. A method of routing of signals through an optical network, comprising determining a route through the network for which the power level within each branch of the network along the route is below a threshold power level which it, a function of the fiber characteristics of the branch.

5. A method according to claim 4, wherein the threshold power level is a function of the core diameter and the higher mode cutoff wavelength of the fiber of the branch.

6. A method according to claim 4, wherein the threshold power level represents the minimum power at which a fiber fuse can be initiated.

7. A method of controlling the routing of signals through an optical network, comprising:

determining a route through the network;

estimating the power level within each branch of the network along the route and determining the fiber characteristics of each branch of the network along the route;

comparing the power level for each branch with a threshold power level, wherein the threshold power level is a function of the fiber characteristics of the branch; and if the power exceeds the threshold power level, determining an alternative route through the network.

8. A method of monitoring an optical network to predict the initiation of fiber fuse, comprising:

measuring the power level within each branch of the network and determining the fiber characteristics of each branch of the network; and comparing the power level for each branch with a threshold power level, wherein the threshold power level is a function of the fiber characteristics of the branch.

9. A method according to claim 8, wherein if the power exceeds the threshold power level, local losses within the branch are measured.

10. A method according to claim 9, wherein if an increase in local loss is detected within a branch, power levels of the signals provided to the network are reduced.

11. A computer program product storing a computer program for implementing a method of monitoring an optical network to predict the initiation of a fiber fuse, the method comprising:

measuring the power level within each branch of the network and determining the fiber characteristics of each branch of the network; and comparing the power level for each branch with a threshold power level, wherein the threshold power level is a function of the fiber characteristics of the branch.

* * * * *